March 18, 1952 — C. OSSMANN — 2,589,427
SALT BOX FOR ANIMALS
Filed Oct. 27, 1949 — 2 SHEETS—SHEET 1
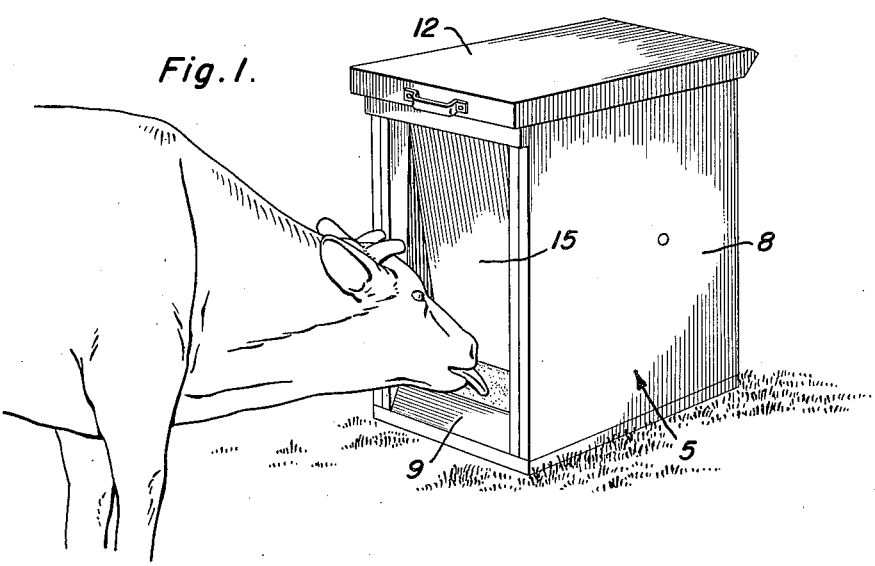
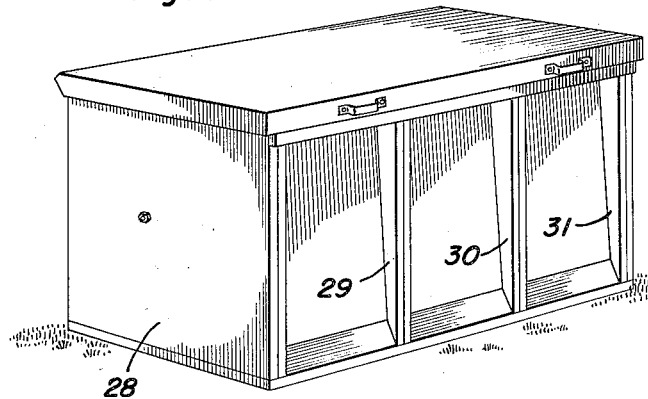
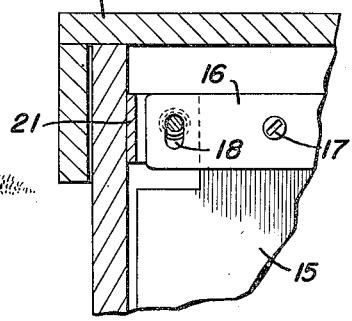
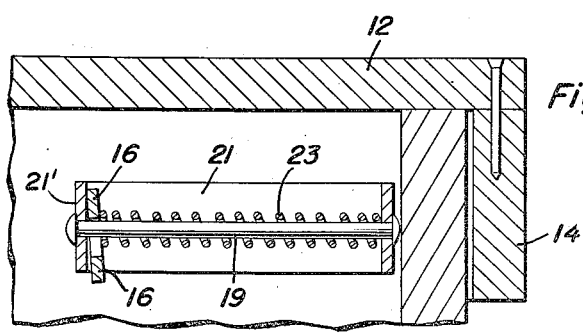
Charles Ossmann
INVENTOR.

March 18, 1952     C. OSSMANN     2,589,427
SALT BOX FOR ANIMALS

Filed Oct. 27, 1949     2 SHEETS—SHEET 2

Charles Ossmann
INVENTOR.

BY *Clarence A. O'Brien*
*and Harvey B. Jacobson*
Attorneys

Patented Mar. 18, 1952

2,589,427

UNITED STATES PATENT OFFICE 2,589,427

SALT BOX FOR ANIMALS

Charles Ossmann, Madison, Wis.

Application October 27, 1949, Serial No. 123,807

2 Claims. (Cl. 20—16)

The present invention relates to new and useful improvements in containers or boxes for dispensing salt, minerals, feed or the like to animals.

An important object of the invention is to provide a novel automatic closure in the front of the salt box which may be easily opened by the animal, but which is safe from being opened by wind or other elements of the weather to thus prevent rain, snow, dust or other foreign substances from entering the box when not in use.

A further object is to provide a salt box in which loose salt may be used to avoid sore tongues frequently caused cattle when licking rock or block salt.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view illustrating a single compartment salt box.

Figure 4 is an enlarged fragmentary sectional view taken on a line 4—4 of Figure 2.

Figure 5 is an enlarged fragmentary sectional view taken on a line 5—5 of Figure 3, and Figure 6 is a perspective view of a multiple compartment salt box.

Figure 2:
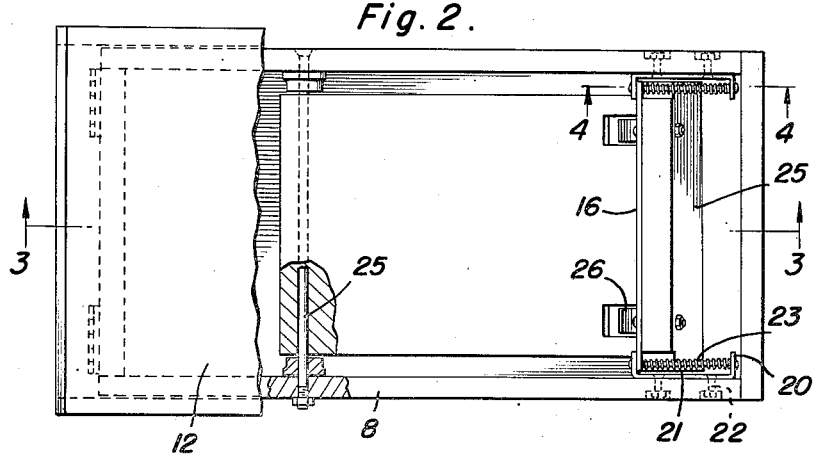
Figure 2 is a top plan view with parts shown in section.

Referring now to the drawings in detail wherein for the purpose of illustration I have disclosed a preferred embodiment of the invention the numeral 5 designates a salt box of a single compartment type and comprising a bottom 6, rear wall 7 and side walls 8. The front of the box is open and provided with a rearwardly sloping lower front wall 9 to form a shallow bin in the bottom of the box in which loose salt 10 is placed. The top of the open front of the box is provided with an upper front wall 11 forming a header at the top of the opening.

The top of the box is closed by a cover or lid 12 which is hinged at its rear edge by conventional hinge structure 13 and is provided at its side and front edges with a downwardly extending skirt 14 to prevent the entrance of rain into the box.

A front door is shown at 15 which closes the opening in the front of the box and is provided at its upper edge with a bar 16 of strap iron secured to the door by bolts and nuts 17. The ends of the bar 16 are formed with vertical slots 18 for receiving horizontal rods 19 supported in the legs 20 of U-shaped horizontal brackets 21 secured to the sides 8 of the box by bolts or the like 22. Coil springs 23 are positioned on the rod 19 and bear against the ends of bar 16 to hold the upper edge of the door 15 rearwardly on the rod 19.

Figure 3:
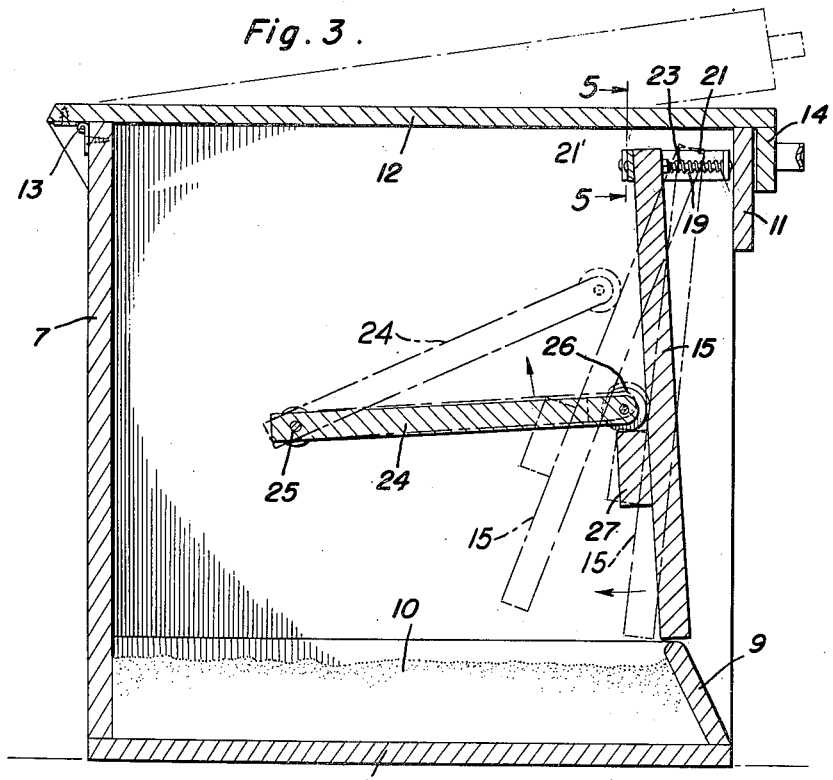
Figure 3 is a longitudinal sectional view taken on a line 3—3 of Figure 2.

The door 15 is free at its lower end to swing inwardly by an animal pushing against the lower portion of the door and the door is held in its closed position with its lower edge inclined forwardly slightly in front of the lower front wall 9, by means of a vertically swinging arm or board 24 pivoted at its rear edge on a transverse rod 25 secured to the sides 8 of the box and having rollers 26 journalled at its front edge bearing against the rear of the door 15 substantially in the transverse center of said door. A stop 27 is secured to the rear surface of door 15 to hold the front edge of arm or board 24 in a slightly upwardly inclined position when the door 15 is closed, as shown more clearly in Figure 3 of the drawings.

In Figure 6 of the drawings I have illustrated a salt box 28 constructed to provide three separate compartments 29, 30 and 31, each compartment embodying a separate salt dispensing unit constructed of the elements heretofore described.

In the operation of the device the front edge of arm or board 24 gravitates to rest on stop 27 whereby to normally hold door 15 closed. When the door 15 is closed, it is perpendicular to the board 24 with its upper edge urged by the springs 23 into a rearward limit of sliding movement on the rods 19 established by engagement of the bar 16 with the rear ends 21' of the brackets 21 as best shown in full lines in Figure 3. An animal pushing against the lower portion of the door 15, below the board 24, will first cause the door to fulcrum on the rollers 26 into partly opened position with its upper edge sliding forwardly and pivoting on the rods 19 in opposition to the springs 23 until said door assumes a downwardly and inwardly inclined position in which it is oblique to said board 24, as shown by dash lines in Figure 3. At this point, the rollers 26 will be cammed upwardly by said door to swing said board 24 upwardly, as shown by dotted lines in Figure 3, whereby to permit said door to be fully opened. When the door 15 is released, the springs 23 will again move the upper edge of the door rearwardly and said door will swing closed under the combined action of gravity and the weight of the board 24 and rollers 26 which will descend and thrust said door into closed position.

The rollers 26 at the front edge of arm or board 24 engaging the rear of door 15 substantially at its center, when the door is closed so wind blowing against the door it will be ineffective in swinging the door open and the salt is thus protected from rain and the sloping arrangement of the door 15 and the sloping position of the lower front wall 9 prevents rain from dripping from the door into the salt bin or from driving under the door.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A closure for a box comprising an upright door, means slidably and pivotally suspending the door at its upper edge to the box in upright position for swinging inwardly and outwardly of the box into open and closed positions respectively, a pivotally mounted member in said box behind said door gravitating downwardly in wiping engagement with said door to swing said door into closed position, and a stop on the rear side of the door engaging said member and limiting downward swinging of said member into a position in which said door and member are perpendicular relatively, whereby said member prevents inward swinging of said door into open position while said door and member are perpendicular relatively, said means including rods on which said door is slidable out of perpendicular relation to said member for camming coaction with said member to swing the member upwardly upon inward swinging of said door into open position.

2. A closure according to claim 1 including springs on said rods opposing sliding of said door on said rods and yieldingly maintaining said door perpendicular to said member when said member is engaged with said stop.

CHARLES OSSMANN.

REFERENCES CITED

The following references are of record in the file of this patent:

UNITED STATES PATENTS

| Number | Name | Date |
|---|---|---|
| 1,172,038 | Orness | Feb. 15, 1916 |
| 1,507,159 | Cosford | Sept. 2, 1924 |
| 1,531,148 | Spicka | Mar. 24, 1925 |
| 1,535,165 | Koerperich et al. | Apr. 28, 1925 |

FOREIGN PATENTS

| Number | Country | Date |
|---|---|---|
| 47,920 | Austria | May 26, 1911 |